United States Patent [19]

Valier

[11] Patent Number: 4,655,334
[45] Date of Patent: Apr. 7, 1987

[54] CLUTCH COVER AND CLUTCH COVER ASSEMBLY

[75] Inventor: Carlo Valier, Pino Torinese, Italy

[73] Assignee: Valeo, Paris, France

[21] Appl. No.: 791,520

[22] Filed: Oct. 25, 1985

[30] Foreign Application Priority Data

Oct. 26, 1984 [FR] France ................ 84 16402

[51] Int. Cl.⁴ ............................................ F16D 13/44
[52] U.S. Cl. ................................ 192/89 B; 192/70.13
[58] Field of Search .............. 192/89 B, 70.13, 109 R, 192/109 A; 29/557; 72/379, 335

[56] References Cited

U.S. PATENT DOCUMENTS

| | | | |
|---|---|---|---|
| 2,560,786 | 7/1951 | Wright et al. .................. | 72/379 X |
| 4,057,131 | 11/1977 | Flotow .......................... | 192/70.13 |
| 4,069,905 | 1/1978 | de Gennes ..................... | 192/112 |
| 4,601,376 | 7/1986 | Reik ............................ | 192/89 B |

FOREIGN PATENT DOCUMENTS

| | | |
|---|---|---|
| 2351314 | 12/1977 | France . |
| 2381938 | 9/1978 | France . |
| 2381940 | 9/1978 | France . |
| 2507719 | 12/1982 | France . |
| 1577243 | 10/1980 | United Kingdom . |
| 2142100 | 1/1985 | United Kingdom . |

Primary Examiner—Carl D. Friedman
Attorney, Agent, or Firm—Charles E. Brown; Charles A. Brown

[57] ABSTRACT

A clutch cover is made in one piece for use in an automobile clutch cover assembly comprising, in addition to the cover, at least a pressure plate and adapted for fastening to a reaction plate. The cover comprises, on its periphery, an alternating sequence of radial zones for coupling to the pressure plate and areas for fastening to the reaction plate. These fastening areas each comprise an axial spacer zone aligned with a radial bearing zone, a plurality of holes for fastening members to be passed through and, in the area of the junction between the spacer zone and the bearing zone, a respective bending aperture aligned with each of the holes.

22 Claims, 5 Drawing Figures

CLUTCH COVER AND CLUTCH COVER ASSEMBLY

BACKGROUND OF THE INVENTION

1. Field of the Invention

The present invention is generally concerned with clutches intended in particular for equipping automobile vehicles and comprising in particular an annular part called the cover.

2. Description of the Prior Art

There are already known clutches of the kind comprising a first plate called the pressure plate, constrained to rotate with a cover and movable axially relative thereto, controllable axially acting elastic means disposed between said cover and said pressure plate urging the latter away from said cover, a friction disk adapted to be constrained to rotate with a first shaft, in general a driven shaft, and a second plate called the reaction plate adapted to be constrained to rotate with a second shaft, in general a driving shaft.

It is usual practice to assemble together the cover, the pressure plate and the controllable action elastic means disposed between them to make up a unit assembly called the clutch cover assembly ready for subsequent direct mounting as such on the associated reaction plate after fitting the friction disk.

This mounting on the reaction plate is usually effected by means of fastening members, such as screws, conveniently distributed along the outside periphery of the cover and substantially radial fastening areas on the cover which naturally have to project externally of the pressure plate and the friction disk. This results in a clutch cover assembly of the kind described, for example, in French patent application 81 11596 (U.S. equivalent Ser. No. 386,397) in which the stamped cover has a considerably greater diameter than the friction disk and the pressure plate, resulting in an increase in the weight, inertia and overall dimensions of the assembly which may be undesirable, especially in heavy trucks and like vehicles.

There is also known from U.S. Pat. No. 4,069,905 a clutch cover assembly fabrication technique which enbles the diameter of the cover to be limited to a value only slightly greater than the diameter of the pressure plate and the friction disk; this technique essentially consists in providing substantially radial fastening areas on the cover by the provision of spacers projecting axially from these areas and attached to said areas as by welding, for example, each of these spacers featuring at a distance from the fastening area from which it projects a bearing surface through which it is adapted to bear radially on the associated reaction plate. However, because of the spacers this technique entails dividing the cover into a certain number of supplementary parts, which has the disadvantage of complicating the structure, and fabrication is difficult to mechanize by virtue of the abundance of parts.

An objective of the present invention is to circumvent the various disadvantages mentioned hereinabove by providing for limiting the overall radial dimension of the cover whilst eliminating the necessity to divide it into separate parts.

SUMMARY OF THE INVENTION

In one aspect, the invention consists in a clutch cover in one piece for use in an automobile clutch cover assembly comprising, in addition to said cover, at least a pressure plate and adapted for fastening to a reaction plate, said cover comprising, on its periphery, an alternating sequence of radial zones for coupling to said pressure plate and areas for fastening to said reaction plate, wherein said fastening areas each comprise an axial spacer zone aligned with a radial bearing zone, a plurality of holes for fastening members to be passed through and, in the area of the junction between said spacer zone and said bearing zone, a respective bending aperture alinged with each of said holes.

By virtue of this arrangement it becomes possible to have the axial spacer zones in the immediate vicinity of the points where the fastening members pass through. Furthermore, the bending apertures facilitate shaping of the cover, notably by stamping.

The spacer zones preferably each comprise an alternating sequence of inside stiffener ribs and outside stiffener ribs with centering bearing surfaces and at least part of each bending aperture preferably lies on one of said outside stiffener ribs.

In practice, each inside stiffener rib is preferably linked to an outside stiffener rib by a molding-shaped portion, and in an advantageous arrangement an annular bearing area formed around each hole through which a fastening member passes is linked to the associated outside stiffener rib and molding-shaped portion by a bracing curved portion. In this way the holes through which the fastening members pass may be disposed closer to one another and have a substantial annular bearing area in spite of the presence of the apertures.

In another aspect, the invention consists in a clutch cover assembly for automobiles comprising a friction disk, an annular clutch cover, a pressure plate axially movable relative to said clutch cover and constrained to rotate therewith and axially acting elastic means between said clutch cover and said pressure plate adapted to urge them apart, said clutch cover having its periphery adapted for fastening it to a reaction plate for controlled clamping of said friction disk between said pressure and reaction plates, in which clutch cover assembly said clutch cover is in one piece and comprises, on its periphery, an alternating sequence of radial zones for coupling to said pressure plate and areas for fastening to said reaction plate, wherein said fastening areas each comprise an axial spacer zone aligned with a radial bearing zone, a plurality of holes for fastening members to be passed through and, in the area of the junction between said spacer zone and said bearing zone, a respective bending aperture aligned with each of said holes, and wherein stiffener means are provided in said spacer zones in the form of bracing curved portions around said bending apertures.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
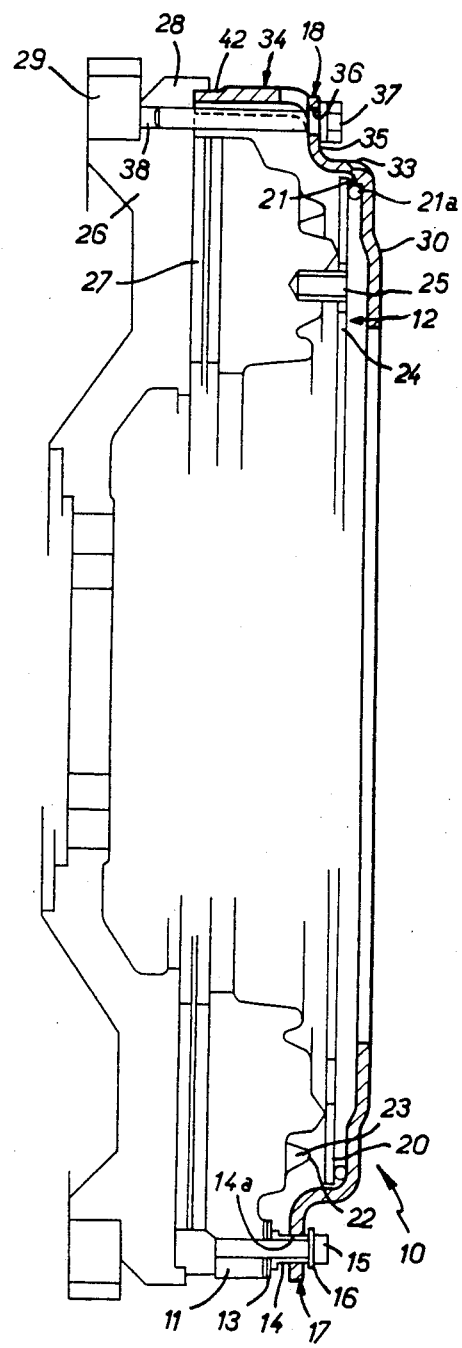
FIG. 1 is a view in cross-section of a clutch cover in accordance with the invention integrated into a clutch cover assembly otherwise known per se.

In the embodiment shown in FIG. 1, the clutch cover assembly generally comprises, in the manner known per se, a first annular part 10 called the cover, a second annular part 11 forming a plate called the pressure plate which is constrained to rotate with the cover 10 whilst being movable axially relative thereto, and controllable axially acting elastic means 12 disposed between the cover 10 and the pressure plate 11 and which normally urge the pressure plate 11 away from the back of the cover 10. In this instance the cover is in a material that can be stamped out, such as sheet steel, for example.

In a manner which is known per se, the pressure plate 11 is constrained to rotate with the cover 10 by means of tangential tabs 13 which extend substantially tangentially from the pressure plate 11 to the cover 10 at points circumferentially distributed on these two annular parts. In the example shown, these tangential tabs are attached to the pressure plate 11 by means of tubular immobilization members 14 locked under the heads of guide screws 15 screwed into the plate, these heads bearing on the tubular immobilization members 14 through the intermediary of bearing washers 16. The tubular immobilization members 14 pass with clearance through openings 14a formed for this purpose in the peripheral area of the cover, more precisely close to one of the circumferential ends of each of the radial coupling zones 17 which alternate at the periphery of the cover with fastening areas, generally referenced 18, the structure of which will be described in more detail hereinafter. It will be noted that in the storage position, when the cover assembly is not attached to the reaction plate, the washers 16 cooperate with the zone 17 to limit axial movement of the pressure plate 11, avoiding deterioration of the tabs 13. The tangential tabs 13 are fastened near the other of the aforementioned ends of each coupling zone 17, as by riveting, for example, using apertures 19 (see FIG. 5); these zones are offset axially relative to the back 30 of the cover in the direction towards the pressure plate by a specific distance, by means of an annular area 32.

In the example shown, and in a manner known per se, the controllable axially acting elastic means 12 disposed between the cover 10 and the pressure plate 11 comprise an annular part called a diaphragm spring 20 forming a spring washer of the Belleville type, in this case bearing at its outside periphery on the cover 10 by virtue of a continuous or discontinuous axial projection 21 at the periphery of the back 30 of the cover. This washer is mounted so as to flex in the immediate vicinity of its inside periphery on the edge 22 of an annular rib 23 on the pressure plate.

The annular part 20 further comprises, in the direction towards the axis of the assembly, radial extensions 24 separated by slots to form clutch release fingers. The reference number 25 designates a stud for centering the diaphragm spring on the pressure plate 11, this stud being disposed between two of the fingers 24 at the roots thereof, in the manner known per se.

A unit assembly of this kind is designed to be fastened to a reaction plate 26 for the purpose of clamping a friction disk 27 between the reaction plate and the pressure plate 11.

A reaction plate 26 of this kind is generally designed to be constrained to rotate with a driving shaft and the associated friction disk 27 is generally designed to be constrained to rotate with a driven shaft. They are shown only schematically in FIG. 1. These parts are well known per se and as they do not form part of the invention they will not be described in detail. It is sufficient to note that the reaction plate 26 has in this instance at its periphery an axial extension 28 facing the clutch cover assembly and contributing directly to centering the clutch cover assembly. In the usual way, this extension serves also as a support for a starter ring 29.

Figure 2:
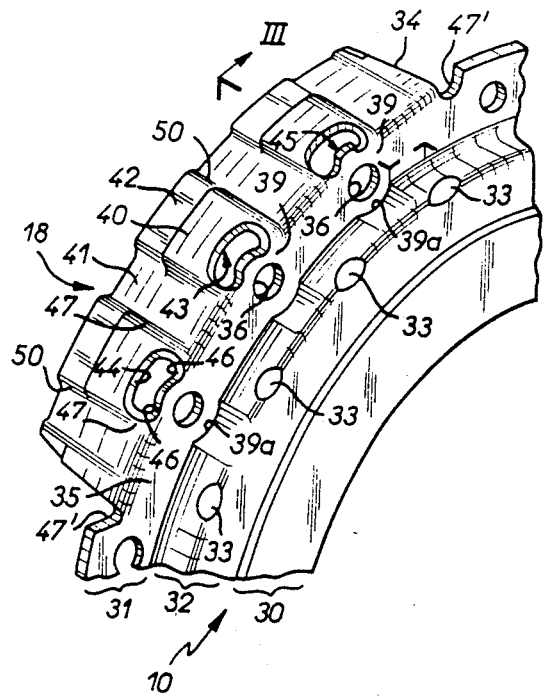
FIG. 2 is a partial view in perspective of a clutch cover in accordance with the invention.
Figure 3:
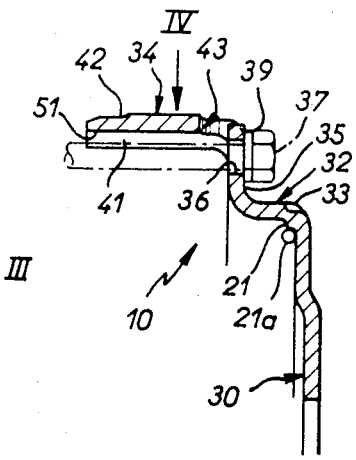
FIG. 3 is a partial view in axial cross-section on the broken line III—III in FIG. 2.
Figure 4:
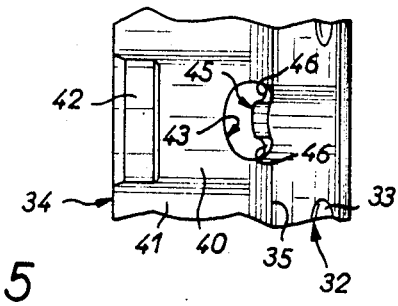
FIG. 4 is a partial view in the direction of the arrow IV in FIG. 3.
Figure 5:
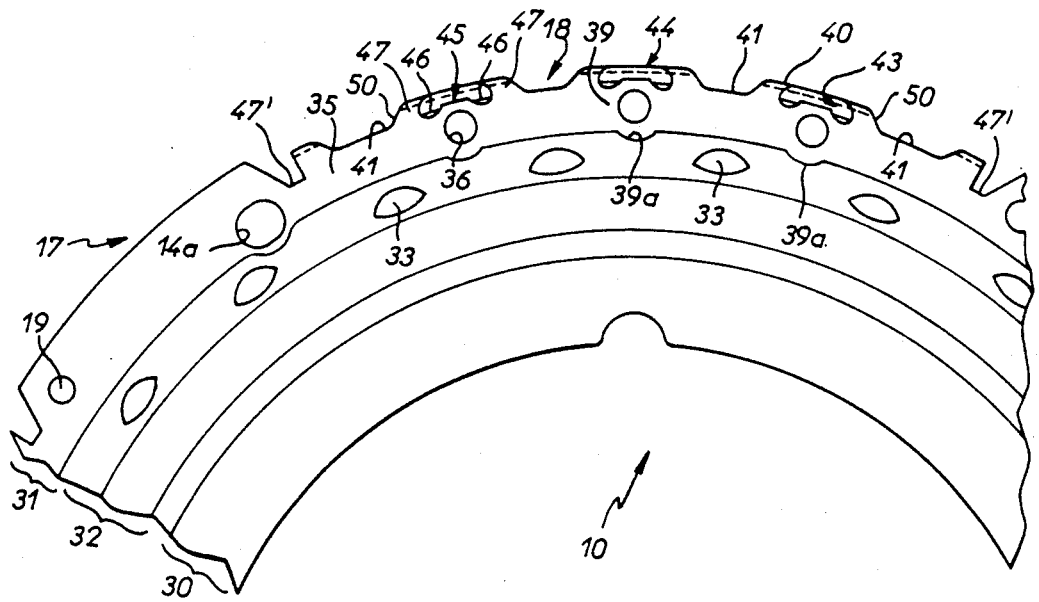
FIG. 5 is a partial front view of the clutch cover in accordance with the invention.

Considering now in more detail the structure of the cover 10 in accordance with the invention (see FIGS. 2 through 5), note that the cover comprises, on respective sides of the axial annular area 32, the annular back 30 and a radially oriented peripheral part 31 offset in the axial direction towards the pressure plate (FIGS. 2 and 5).

The axial annular area 32, which determines this offset, features at the point where it joins to the annular back 30 a series of localized stamped areas 33 obtained by appropriate punching action, in the manner known per se, so as to form on the inside surface of the cover a series of axial projections 21 which are designed to center a bearing ring 21a for the peripheral edge of the diaphragm spring.

The peripheral part 31 features an alternating sequence of fastening areas 18 and coupling zones 17.

In each fastening area 18 an axially oriented spacer area 34 designed to cooperate nesting fashion with the peripheral axial extension 28 of the reaction plate 26, for bearing engagement and centering on the reaction plate, is joined to a radial zone 35 called the bearing zone.

The radial bearing zone 35 features holes 36 each adapted to have passed through it a fastening member such as a screw 37 adapted to be fixed into a corresponding threaded hole 38 (FIG. 1) in the reaction plate 26.

Around each of these holes 36 there is formed on the radial zone 35 an annular bearing area 39 for the head of the fastening member. This annular bearing area 39 is obtained by means of a recessed part 39a formed in the axial annular area 32. Note that these recessed parts 39a alternate circumferentially with the localized stamped areas 33, the latter being situated radially beyond the projections 21. Each spacer area 34 comprises generally axially oriented stiffener ribs 41 offset radially towards the inside between the passages for the fastening members, alternating with generally axially oriented stiffener ribs 40 situated radially outwards of these passages but extending around them as closely as possible.

For convenience the stiffener ribs 41 will be called inside stiffener ribs and the stiffener ribs 40 will be called outside stiffener ribs since they are situated radially outside the ribs 41. The outside stiffener ribs 40 are of greater circumferential extent than the inside stiffener ribs 41.

The inside stiffener ribs 41 are joined to the outside stiffener ribs 40 by molding-shaped portions 50; the joining of the annular bearing area 39 on the outside stiffener ribs 40 and the portion 50 is achieved by means of a bracing area 47 called the bracing curve and forming stiffener means.

The two circumferential ends of the spacer area 34 are joined by end notches 47′ (FIGS. 2 and 5) to the adjacent coupling zones 17. In practice the zones 17 and the radial bearing zones 35 are in the same transverse plane. These two zones 17 and 35 may naturally be offset axially.

The cover is centered relative to the reaction plate by centering bearing surfaces 42 machined on the end parts of the outside stiffener ribs 40 of the spacer area 34, cooperating nesting fashion (see FIG. 1) with the cylindrical bearing surface provided by the axial extension 28 of the reaction plate 26. Note that the end part of the spacer area 34 bears on the reaction plate 28.

In the area of the junction between the spacer area 34 and the bearing zone 35 and aligned with each hole 36 there is formed a so-called bending aperture 43. In practice the bending apertures 43 are formed in the outside stiffener rib 40, which also carries the centering bearing surfaces, and the circumferential extent of said bending apertures is in this case less than that of the outside stiffener ribs 40.

Each aperture 43 features, on the one hand, in the outside stiffener rib 40, a substantially concave border 45 and, on the other hand, in the annular bearing area 39, a plane or convex border 45 which is joined to the border 44 by two generally concave parts 46 of small radius of curvature situated in the bracing area 47 and the edge of which has been subjected to buckling on bending. The aperture as described thus has a "kidney bean" shape.

It should be noted that the plane or convex border 45 is substantially radially aligned with the inside surface 51 of the outside stiffener rib 40 or at most at a radial level located within the thickness of the outside stiffener rib 40. In this way it remains a simple matter to flatten the annular bearing area 39 in spite of the overlying relationship between the annular bearing area 39 and the outside stiffener rib 40 as described hereinabove.

In this way and by virtue of their location, these apertures facilitate bending of the spacer area 34 during fabrication of the cover by stamping, without risk of forming a bead of material where the fastening members pass through, given the absence of material at this location. It is therefore possible to bring as close together as possible the spacer areas 34 and the passages for the fastening members 37 and thus the outside periphery of the friction disk 27 and the pressure plate 11, and in this way to reduce the overall radial dimension of a cover 10 of this kind whilst retaining an adequate annular bearing area 39 for the fastening members.

By virtue of the advantageous "kidney bean" shape of the apertures 33, and in particular by virtue of the bracing curves 47, bracing of the annular bearing area 39 is obtained with respect to axial forces exerted on the annular bearing area 39 in the direction towards the spacer area 34; in this way the annular bearing area is reinforced. It will be appreciated that it is possible to have the apertures 36 very close to one another, which make it possible to have a high force clamping the cover to the pressure plate and thus to obtain a clutch with a high torque transmission rating, whilst having a spacer area as close as possible to the fastening members in combination with substantial annular bearing areas, in spite of the small depth which exists in practice between the outside stiffener ribs 40 and the inside stiffener ribs 41 and in spite of the presence of the apertures 43.

It should be noted that when designing a clutch cover structure of this kind it proves necessary to overcome the prejudice or received wisdom which holds that a bending area should not feature any openings likely to weaken it. In this case, whilst exploiting the advantage of an aperture in the bending area, which provides for a reduction in the overall radial dimension of the cover, a reinforcement of the bending area has been achieved through the advantageous shape of the aperture itself, which evidently is not obvious.

It will be understood that various changes in the details, materials and arrangements of parts which have been herein described and illustrated in order to explain the nature of the invention may be made by those skilled in the art within the principle and scope of the invention as expressed in the appended claims.

This applies to the size and number of the bending apertures, for example. Specifically, the apertures 43 may be of greater circumferential extent than the outside ribs 40 and extend into the portions 50; this is the case when, for example, for the same overall dimension, the areas 50 are of greater circumferential extent and the ribs 40 of less circumferential extent. In all cases, the apertures 43 extend at least partially into the outside stiffener ribs 40. As another alternative, the bearing ring for the diaphram spring on the cover may be formed as a simple bead.

I claim:

1. Clutch cover in one piece for use in an automobile clutch cover assembly comprising, in addition to said cover, at least a pressure plate and adapted for fastening to a reaction plate, said cover comprising, on its periphery, an alternating sequence of radial zones for coupling to said pressure plate and areas for fastening to said reaction plate, wherein said fastening areas each comprise an axial spacer zone aligned with a radial bearing zone, a plurality of holes for fastening members to be passed through and, in the area of the junction between said spacer zone and said bearing zone, a respective bending aperture aligned with each of said holes, said bending apertures are kidney bean shaped and each has a plane or convex border in said annular bearing area around that of said holes with which it is aligned.

2. Clutch cover according to claim 1, wherein said spacer zones each comprise an alternating sequence of inside stiffener ribs and outside stiffener ribs with centering bearing surfaces and at least part of each bending aperture lies on one of said outside stiffener ribs.

3. Clutch cover according to claim 2, wherein each radial bearing zone comprises a respective annular bearing area around each of said holes, each inside stiffener rib is linked to an outside stiffener rib by a molding-shaped portion, and each annular bearing area is linked to the outside stiffener rib and to the molding-shaped portion by a bracing curved portion forming stiffener means.

4. Clutch cover according to claim 3, wherein said bending apertures are kidney bean shaped and each has a plane or convex border in said annular bearing area around that of said holes with which it is aligned.

5. Clutch cover according to claim 4, wherein said border is substantially in radial alignment with the inside surface of the associated outside stiffener rib.

6. Clutch cover according to claim 4, wherein said border is substantially in radial alignment with the thickness of the associated outside stiffener rib.

7. Clutch cover according to claim 2, wherein said bending apertures are kidney bean shaped and each has a plane or convex border in said annular bearing area around that of said holes with which it is aligned.

8. Clutch cover according to claim 7, wherein said border is substantially in radial alignment with the inside surface of the associated outside stiffener rib.

9. Clutch cover according to claim 7, wherein said border is substantially in radial alignment with the thickness of the associated outside stiffener rib.

10. Clutch cover according to claim 2, wherein said border is substantially in radial alignment with the inside surface of the associated outside stiffener rib.

11. Clutch cover according to claim 10, wherein said plane or convex border merges with a border of said bending aperture in said outside stiffener rib through two concave areas of small radius of curvature in said bracing curved portion.

12. Clutch cover according to claim 2, wherein said border is substantially in radial alignment with the thickness of the associated outside stiffener rib.

13. Clutch cover according to claim 2, wherein said plane or convex border merges with a border of said bending aperture in said outside stiffener rib through two concave areas of small radius of curvature in said bracing curved portion.

14. Clutch cover according to claim 13, wherein the edge of said concave areas is buckled.

15. Clutch cover according to claim 1, wherein each radial bearing zone comprises a respective annular bearing area around each of said holes, each inside stiffener rib is linked to an outside stiffener rib by a molding-shaped portion, and each annular bearing area is linked to the outside stiffener rib and to the molding-shaped portion by a bracing curved portion forming stiffener means.

16. Clutch cover according to claim 15, wherein said bending apertures are kidney bean shaped and each has a plane or convex border in said annular bearing area around that of said holes with which it is aligned.

17. Clutch cover according to claim 16, wherein said border is substantially in radial alignment with the inside surface of the associated outside stiffener rib.

18. Clutch cover according to claim 16, wherein said border is substantially in radial alignment with the thickness of the associated outside stiffener rib.

19. Clutch cover assembly for automobiles comprising a friction disk, an annular clutch cover, a pressure plate axially movable relative to said clutch cover and constrained to rotate therewith and axially acting elastic means between said clutch cover and said pressure plate adapted to urge them apart, said clutch cover having its periphery adapted for fastening it to a reaction plate for controlled clamping of said friction disk between said pressure and reaction plates, in which clutch cover assembly said clutch cover is in one piece and comprises, on its periphery, an alternating sequence of radial zones for coupling to said pressure plate and areas for fastening to said reaction plate, wherein said fastening areas each comprise an axial spacer zone aligned with a radial bearing zone, a plurality of holes for fastening members to be passed through and, in the area of the junction between said spacer zone and said bearing zone, a respective bending aperture aligned with each of said holes, and wherein stiffener means are provided in said spacer zones in the form of bracing curved portions around said bending apertures.

20. Clutch cover in one piece for use in an automobile clutch cover assembly of the type including at least a pressure plate and adapted for fastening to a reaction plate, said cover comprising on its periphery, an alternating sequence of radial zones for coupling to a pressure plate and fastening areas for fastening to a reaction plate, said fastening areas each comprising an axial spacer zone extending axially from and aligned with a radial bearing zone, a plurality of holes for receiving fastening members arranged in each of said bearing zones, respective bending apertures arranged in the area of the junction between each of said spacer zones and the aligned bearing zones, said bending apertures being radially aligned with and closely adjacent respective ones of said holes.

21. Clutch cover according to claim 20, wherein each of said spacer zones comprises an alternating sequence of stiffener ribs having inside stiffener ribs and outside stiffener ribs, located between two alternating inside stiffener ribs and adjacent an axial end of one of said outside stiffener ribs and at least part of each of said bending apertures being defined in one of said outside stiffener ribs.

22. Clutch cover according to claim 21, wherein each of said radial bearing zones comprises a respective annular bearing area around each of said holes, said inside stiffener ribs being joined to adjacent said outside stiffener ribs by a filleted portion, said annular bearing areas being joined to outside stiffener ribs and to said filleted portion by a bracing curved portion forming stiffener means.

* * * * *